(12) United States Patent
Remillard et al.

(10) Patent No.: US 11,129,328 B2
(45) Date of Patent: Sep. 28, 2021

(54) CROP HARVESTING MACHINE

(71) Applicant: MacDon Industries Ltd., Winnipeg (CA)

(72) Inventors: Rheal Remillard, St. Joseph (CA); Francois R. Talbot, Winnipeg (CA)

(73) Assignee: MacDon Industries LTD, Winnipeg (CA)

(*) Notice: Subject to any disclaimer, the term of this patent is extended or adjusted under 35 U.S.C. 154(b) by 179 days.

(21) Appl. No.: 16/440,392

(22) Filed: Jun. 13, 2019

(65) Prior Publication Data
US 2020/0390030 A1    Dec. 17, 2020

(51) Int. Cl.
| | |
|---|---|
| *A01D 34/23* | (2006.01) |
| *A01D 34/06* | (2006.01) |
| *A01D 41/06* | (2006.01) |
| *A01D 63/04* | (2006.01) |
| *A01D 61/00* | (2006.01) |
| *A01D 69/00* | (2006.01) |

(52) U.S. Cl.
CPC ............. *A01D 34/23* (2013.01); *A01D 34/06* (2013.01); *A01D 41/06* (2013.01); *A01D 61/00* (2013.01); *A01D 63/04* (2013.01); *A01D 69/005* (2013.01)

(58) Field of Classification Search
CPC .. A01D 34/001; A01D 34/035; A01D 34/043; A01D 34/06; A01D 34/14; A01D 34/145; A01D 34/23; A01D 41/06; A01D 41/141; A01D 45/021; A01D 47/00; A01D 57/22; A01D 57/24; A01D 63/00; A01D 63/02; A01D 63/04; A01D 69/002; A01D 69/005; A01D 69/06

USPC ......................................................... 56/11.9
See application file for complete search history.

(56) References Cited

U.S. PATENT DOCUMENTS

| | | | |
|---|---|---|---|
| 5,711,140 A * | 1/1998 | Burmann | A01D 41/148 56/14.4 |
| 5,867,972 A * | 2/1999 | Laumann | A01D 41/14 56/126 |
| 7,082,742 B2 * | 8/2006 | Schrattenecker | A01D 41/148 56/208 |

(Continued)

FOREIGN PATENT DOCUMENTS

| | | |
|---|---|---|
| DE | 3325194 | 1/1985 |
| DE | 202016100325 | 4/2017 |
| EP | 2647276 | 10/2013 |

*Primary Examiner* — Thomas B Will
*Assistant Examiner* — Matthew Ian Neal
(74) *Attorney, Agent, or Firm* — Miller Canfield

(57) ABSTRACT

A vertical crop divider knife is mounted at each end of the cutter bar of a header and stands upwardly from the end to cut crop tending to collect over the end divider. Each divider knife includes a drive linkage in the housing for communicating drive to the knife sickle bar. Each divider housing has a mounting assembly for coupling to a cooperating mounting assembly on the housing of the crop divider knife structure by which the crop divider knife structure is readily attachable to the crop divider housing using a hook coupling at the bottom and a latch at the top for operation and releasable from the crop divider housing when not required. The divider housing carries a hydraulic motor and a forwardly facing output coupling mounted on the divider housing which automatically meshes with an input coupling on the knife housing when the knife drive housing is installed.

10 Claims, 6 Drawing Sheets

(56) References Cited

U.S. PATENT DOCUMENTS

| | | | | |
|---|---|---|---|---|
| 9,392,745 B2* | 7/2016 | Bertino | ............... | A01D 45/22 |
| 2013/0263566 A1* | 10/2013 | Lovett | ............... | A01D 34/23 |
| | | | | 56/158 |
| 2014/0250850 A1* | 9/2014 | Boenig | ............... | A01D 34/23 |
| | | | | 56/94 |
| 2015/0156965 A1* | 6/2015 | Bertino | ............... | A01D 67/00 |
| | | | | 56/192 |

* cited by examiner

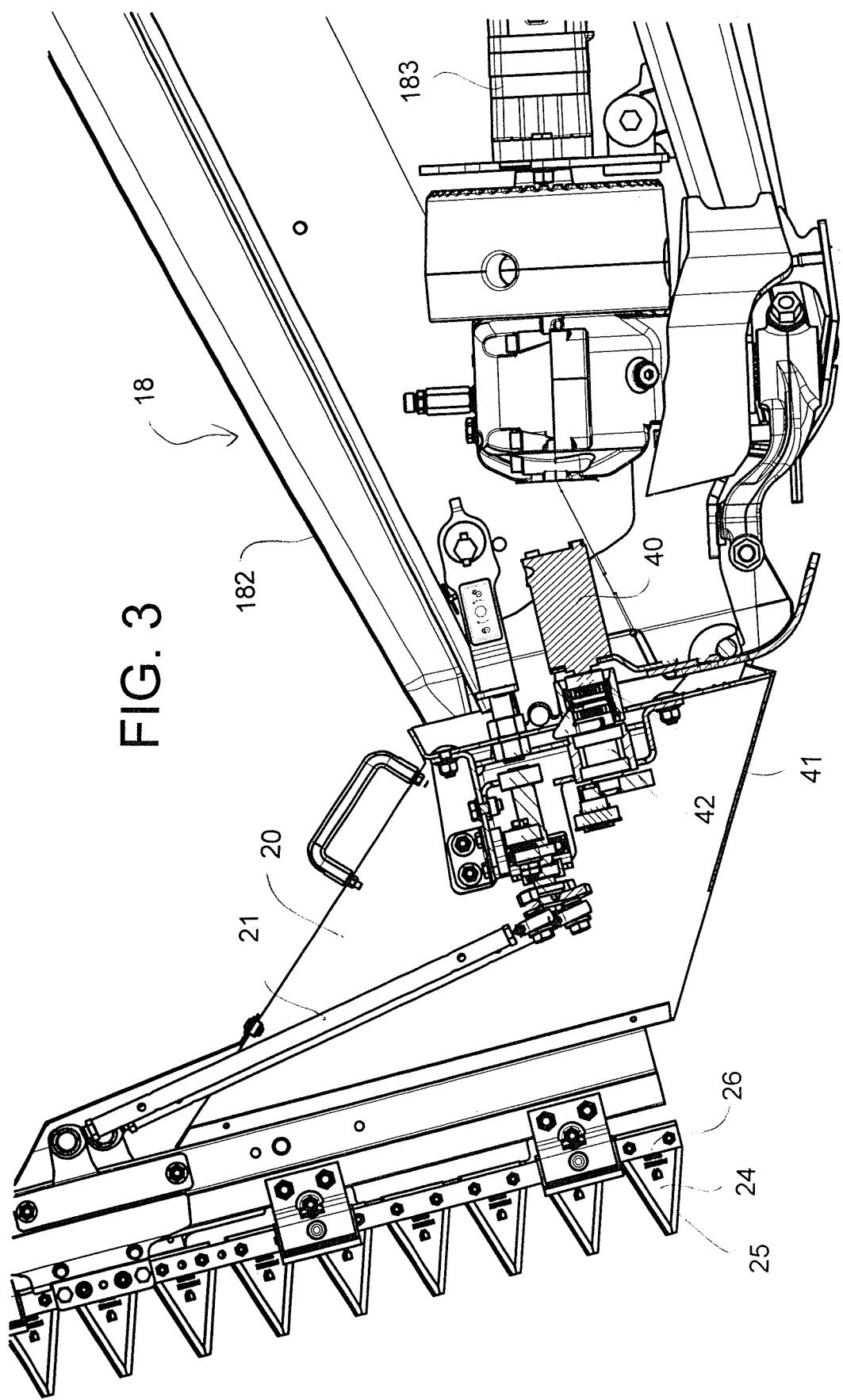

CROP HARVESTING MACHINE

This invention relates to headers for agricultural harvesting machines including an end cutting device at the crop divider.

BACKGROUND OF THE INVENTION

Headers used to cut non-row crops, such as wheat, rapeseed, flax, oats, and soybeans have a horizontal and laterally extending frame with a forward edge to which an elongate reciprocating knife is attached. This reciprocating knife includes at least one reciprocating bar to which a plurality of blades are attached and extend across substantially the entire width of the draper header. As these blades are driven in reciprocation, they engage stationary knife guards. The stationary knife guards are fixed to the leading edge of the draper header. The reciprocating blades, typically triangular, chop off the stalks of the crop plants typically close to the ground. The severed crop plants fall backwards onto a moving conveyor belt which carries them to the outlet of the header. Some crop plants are extremely high, such as canola or rapeseed. These plants can is reach 2-3 meters in height. They are also relatively weak. As a result, in strong winds (or late in the growing season) they may fall to one side or the other, becoming entangled with their neighboring plants.

This poses a problem in the crops, in that, as the draper header harvesting the plants moves through the field, some of the plants may wind up draped over the end covers of the draper header and if these plants are entangled with the stalks of the plants next to them, they can be uprooted and dragged along behind the draper header, dangling from the sides of the draper header. As the draper header proceeds further down the field, this mass hanging from each end of the draper header will eventually be lost and unharvested.

To solve this problem, manufacturers provide an upstanding crop divider knife that is located at the end crop divider to cut through the crop plants at the crop divider and forcing them to fall to one side or the other of the crop divider.

Crop divider knives stand generally in a vertical plane at the end divider, although they may be angled backward on top of the crop divider or slightly inwardly or outwardly. Variations from vertical may be provided to enhance the crop divider knife's ability to sever the crop riding up on top of the crop divider.

This application relates to a cutting device at the divider which cuts the crops in a generally upstanding direction to aid the dividing of the crops at the ends of the header. Many different designs of cutting device can be used including rotating chain type systems where a front run of the chain stands at a front of the cutting device, or rotating wheel type devices where an upstanding disk has edge cutting blades. In some cases the cutting device is of the reciprocating sickle type. The present application is not directed to any particular design of the cutting device itself but is only directed to the mounting and drive coupling between the divider and the housing of the cutting device. The description and drawings herein thus show one example only of a cutting device and no claim is made to the design and arrangement of the type of cutting device per se.

The cutting device is mounted on a housing attached to the end divider and is typically mounted in front of the horizontal header knife located just above the ground and with the cutting components thereof extending upwardly and generally forwardly therefrom.

SUMMARY OF THE INVENTION

It is one object of the present invention to provide an improved mounting and drive arrangement for the divider knife on the header.

According to the invention there is provided a crop harvesting header for a harvester comprising:

a main frame structure extending across between two ends of the header across a width of the header for movement in a direction generally at right angles to the width across ground including a crop to be harvested;

a mounting assembly for carrying the main frame structure on the harvester;

a cutter bar across a front of the main frame structure carrying a cutter knife operable for cutting the crop as the header is moved forwardly across the ground;

a crop transport system for moving the cut crop toward a discharge location of the header for feeding the crop into a feed opening of the harvester;

first and second crop dividers each at a respective end of the main fame structure and defining an end wall confining cut crop onto the transport system;

and first and second cutting device each mounted on a forward end of a respective one of the first and second crop dividers for cutting and dividing crop at the respective divider;

each divider having a hydraulic motor and an output coupling mounted on the divider for providing drive to the cutting device;

each divider having a mounting assembly thereon for coupling to a cooperating mounting assembly on the cutting device by which the knife structure is readily attachable to the crop divider for operation and releasable from the crop divider when not required;

each cutting device having an input coupling thereon for cooperating attachment to the output coupling arranged such that the input coupling and output coupling are released from cooperating attachment by the release of the knife structure from the crop divider.

Preferably the mounting assembly includes a latch which pulls the cutting device into engagement with the crop divider.

Preferably the mounting assembly of the crop divider includes at least one member for hooked engagement with a cooperating component of the cutting device.

Preferably the latch is manually operably by a human operator so that the operator can readily remove a front cap or cone on the divided held by the same hook and latching arrangement and can apply the cutting device when required.

Preferably the cooperating component of the knife structure comprises hook elements which pivot around an axis of the member on the crop divider to allow the knife structure to pivot into engagement with the crop divider. Preferably in this arrangement the member forming the hooked engagement is at the bottom of the cutting device allowing the cutting device to pivot upwardly and toward the crop divider and there is provided a latch at the top of the crop divider to cooperate with a top portion of the cutting device in latching engagement. In this arrangement preferably the latch is above the output coupling.

In one preferred arrangement the hydraulic motor has a shaft with an axis thereof extending generally forwardly of the crop divider housing and carrying thereon said output coupling rotatable about said axis. This can be a splined shaft or coupling which moves into engagement with a cooperating sleeve. However many inter-engaging coupling arrangements are available which will allow automatic engagement when the receptacle moves into engagement with the drive.

That is preferably the mounting assembly includes at least one engaging hook member for hooked engagement with a cooperating component of the cutting device located at one of the top or bottom of the crop divider and a latch at the other of the top or bottom of the crop divider for pulling the cutting device into engagement with the crop divider, and the cooperating input and output couplings are located between the top and bottom of the crop divider.

For most simple and efficient engagement, the hook member is at the bottom of the cutting device for engagement with a member at the bottom of the cutting device and allows pivotal movement of the cutting device around an axis upwardly and toward the crop divider for operation of the latch to hold it in place.

The latch is preferably of a type which requires operation to pull the top of the cutting device into place where it can be locked by a locking pin to ensure that the cutting device remains in location even during the significant vibration and jerking which can occur at the end of a header in operation.

Preferably there is provided a handle on the cutting device to help lift the cutting device for said pivotal movement around the pivot axis.

BRIEF DESCRIPTION OF THE DRAWINGS

One embodiment of the invention will now be described in conjunction with the accompanying drawings in which:

FIG. 3 is an end elevational view of the header of FIG. 1 on an enlarged scale and showing the coupling between the cutting device and the crop divider.

In the drawings like characters of reference indicate corresponding parts in the different figures.

DETAILED DESCRIPTION

Figure 1:
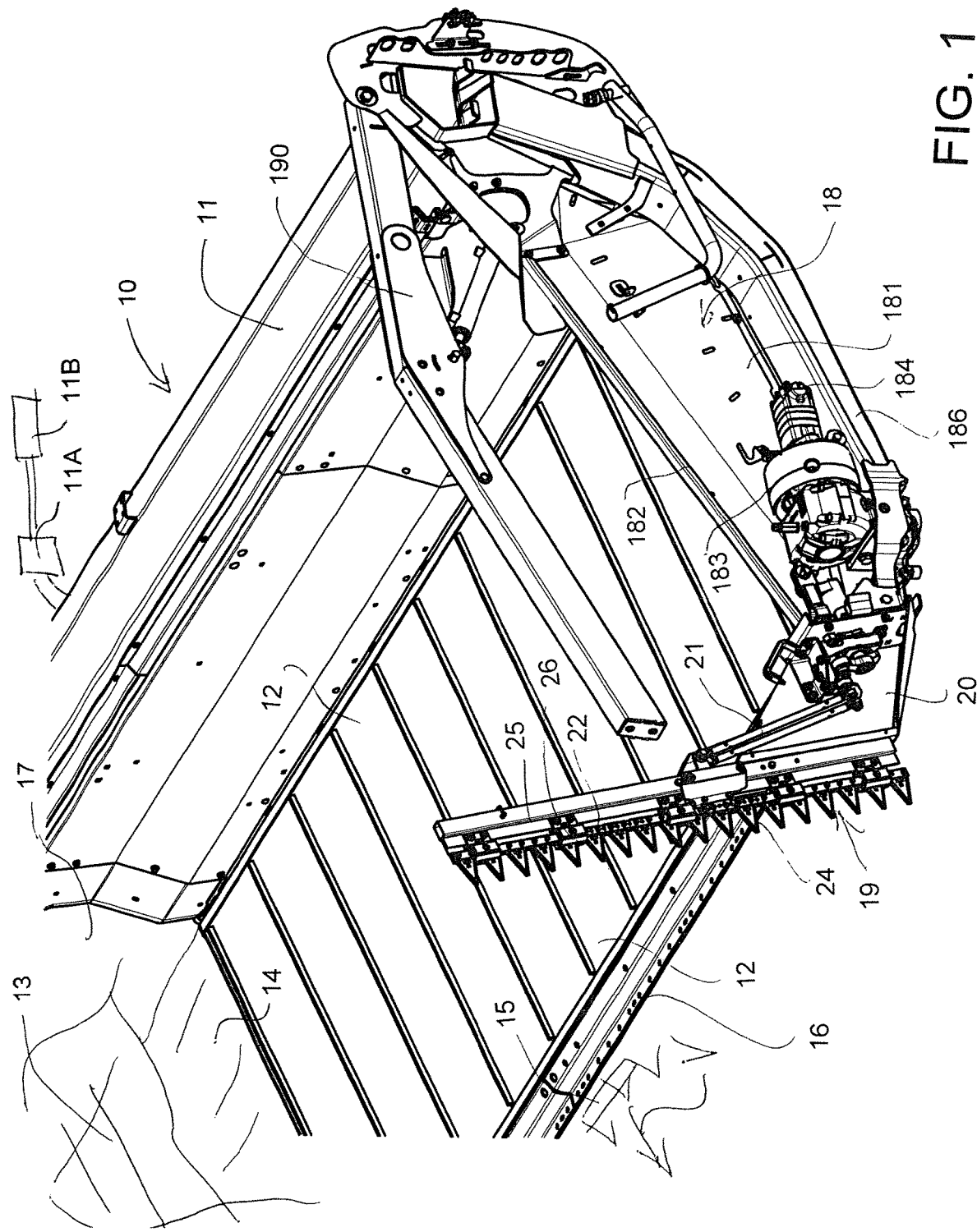
FIG. 1 is an isometric view of a center and one end section only of a header with a number of elements such as the reel omitted for convenience of illustration and showing the mounting and drive arrangement for the cutting device according to the present invention.

FIG. 1 shows a draper header 10 for mounting on an agricultural combine (not shown). The draper header 10 has a frame 11 that extends laterally and perpendicular to the direction of travel V of the combine through the field. The frame 11 supports left side conveyor 12, right side conveyor 13, and a center conveyor 14.

A reciprocating knife 15 is fixed to a forward edge 16 of the frame and extends across substantially the entire width of the draper header. The reciprocating knife 15 is arranged to sever the stalks of plants close to the ground and permit them to fall backwards on the conveyors. The left and right side conveyors, in turn, convey this cut crop material laterally inwardly toward the center conveyor 14 which then conveys the cut crop material rearward through an aperture 17 in the frame 11 of the draper header and thence into the agricultural combine (not shown) that carries the draper header through the field harvesting crop.

Two crop dividers 18 extend forward from the frame 11 on the left and right side of the draper header. These crop dividers 18 are fixed to the frame 11 and extend forward therefrom. In the figures only the left-hand divider is shown but it will be appreciated that the opposite right-hand divider is symmetrical. The dividers can be mounted rigidly to the frame or may pivot about a transverse axis to float upwardly and downwardly to match ground contour. A reel support arm 190 is mounted on the frame 11 at the divider with the reel omitted for convenience of illustration. Typically the divider forms a panel that is attached rigidly to the frame item 18 and does not float relative to the frame. The divider can comprise an inwardly facing metal sheet and a top plastic cover.

The crop dividers 18 support cutting devices 19 that are mounted at the forward ends of the crop dividers 18. The crop divider knife members 19 on the left and right dividers 18 have the same construction. For this reason, the description below is directed only to the mounting and drive arrangement for the cutting device 19.

It will be appreciated that the particular design of the cutting device shown is merely one example of many different designs well known in the art. The present invention is not directed to the design of the cutting device itself nor any feature thereof and the arrangement shown is merely one example, included herein to ensure that the best mode currently known to the applicant is included herein.

Figure 2:
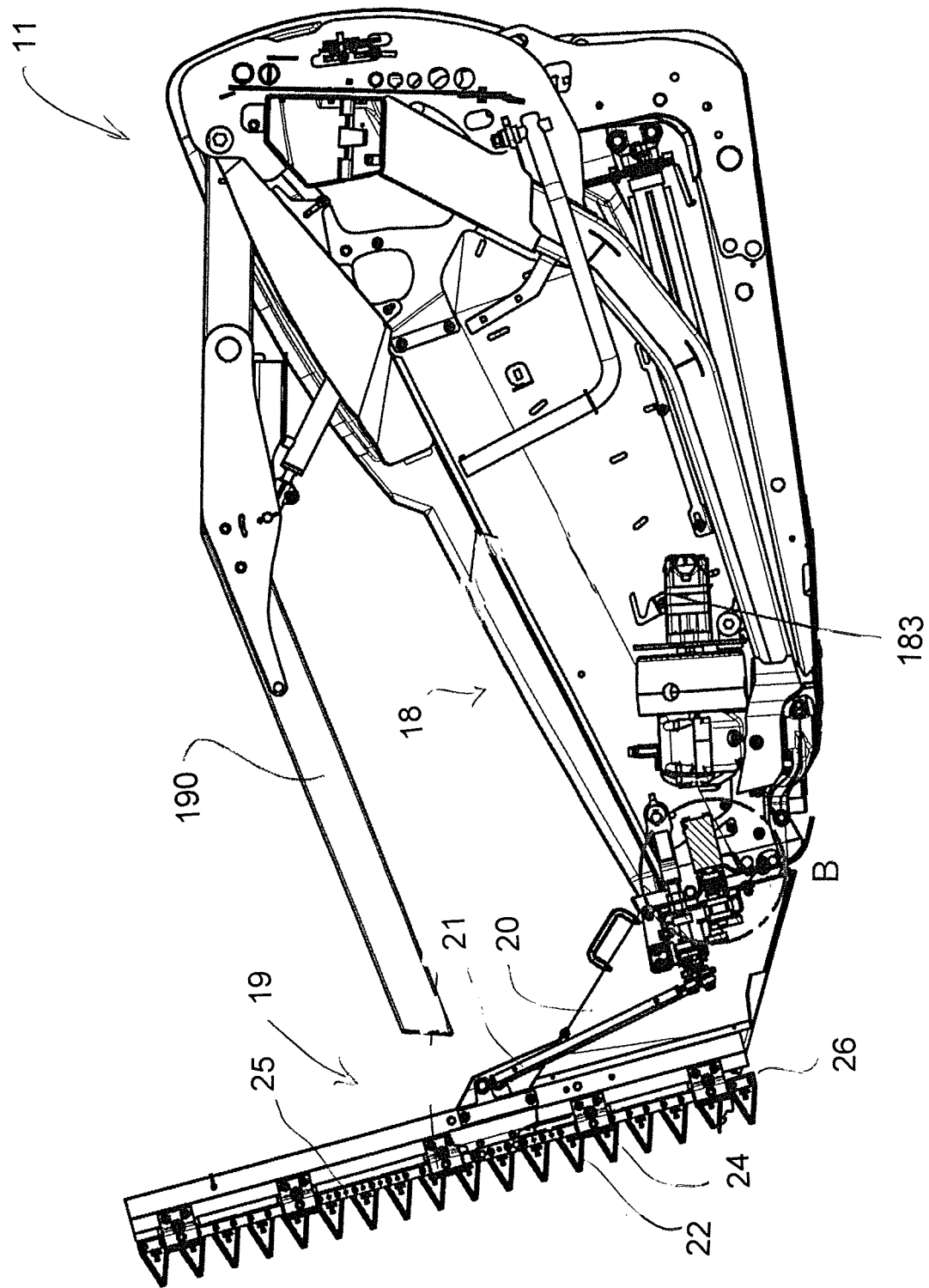
FIG. 2 is an end elevational view of the header of FIG. 1.

Referring to FIGS. 1 and 2, the crop divider knife members 19 each comprise a knife support housing 20, a connecting linkage 21, knife guards 22, knife blades 24 mounted on an elongate support bar 25 which extends upwardly from the forward end of crop divider 19. The knife support bar 25 extends generally vertically but may also be provided with a forward or rearward inclination to enhance its operations severing certain crops.

The knife support 25 supports reciprocating knife sickle bar 26 in the form of an elongate rigid member to which a plurality of knife elements 24 are bolted. Knife elements 24 have cutting edges that engage and sever the portion of the crop hanging over the crop divider 19. The plurality of knife elements 24 are fixed to the sickle bar and are spaced along substantially the entire length of the sickle bar.

The main frame structure 11 extends across between two ends of the header across a width of the header for movement in the direction V generally at right angles to the width across ground including the crop to be harvested. The frame is mounted on a mounting assembly shown very schematically at 11A for carrying the main frame structure on the harvester also shown schematically at 11B. The header further includes the cutter bar 16 across a front of the main frame structure carrying the cutter knife 15 operable for cutting the crop as the header is moved forwardly across the ground. The drapers 12, 13 and 14 form a crop transport system for moving the cut crop toward a discharge location 17 of the header for feeding the crop into the feed opening of the harvester 11B. The header further includes the first and second divider housings 18 each at a respective end of the main frame structure and defining an end wall 181 confining cut crop onto the transport system. The housing 18 further typically includes a top wall 182 and an outer closure wall (not shown) enclosing the drive components for the knife 15 including a motor and vibration system 183 driven by a hydraulic supply 184. A bottom wall 186 of the divider housing forms a skid plate running over the ground when the cutter bar 16 is resting on the ground for ground cutting action.

The arrangement of the present invention provides the first and second crop divider knife structures 19 each mounted on a forward end of a respective one of the crop divider housings 18.

Each crop divider knife structure 19 comprises the cutter bar 25 having a plurality of the knife guards 24. The sickle knife 26 is mounted on the cutter bar 25 for reciprocating movement longitudinally of the cutter bar with the blades 26 thereon.

The housing 20 mounts the cutter bar on the crop divider housing 18 in a manner described below. The drive linkage 21 in the housing 20 operates for communicating drive to the sickle bar from the drive system in the divider housing 18.

The drive system for each end knife comprises a hydraulic drive motor 40 and an output coupling 41 mounted on the divider housing for providing drive to the drive linkage 21 though an input coupling 42 carried on the end knife housing.

Each divider housing has a mounting assembly 43 thereon for coupling to a cooperating mounting assembly 44 on the housing of the crop divider knife structure by which the crop divider knife structure is readily attachable to the crop divider housing for operation and releasable from the crop divider housing when not required.

Each housing of the crop divider knife structure has the input coupling 42 thereon arranged for cooperating attachment to the output coupling 41 arranged such that the input coupling and output coupling are released from cooperating attachment by the release of the crop divider knife structure from the crop divider housing. Such couplings are typically formed by a coaxial intermeshing disk and sleeve arrangement with radial projections which automatically couple or inter-engage when the two components are brought together along or generally parallel to the common axis. Many designs of such coupling arrangements are available to be used in this construction.

The coupling which holds the rear face of the knife drive housing on the front face of the divider housing mounting assembly includes the components 43 on the divider and the component 44 on the knife structure. These include a latch 46 on the divider, typically of an over-center hook type which grasps and pulls a cooperating loop 47 on the housing of the crop divider knife structure into engagement with the crop divider housing. Further, the mounting assembly 43, 44 includes at least one and typically two engaging hook members 48 on the knife drive housing which projects rearwardly and can be looped over a receptacle or rod 49 on the divider for hooked engagement between the housing of the knife structure and the divider. That is when the operator of the combine wishes to use a vertical knife for the type of crops to be harvested, the operator carries the knife drive and its housing up to the divider so that the rear face of the knife drive is brought up to the front face of the divider.

In many cases a cover or cone is provided to protect the front face of the divider when the knife drive is removed and this should be removed or moved aside to allow the vertical knife drive to engage.

In this position, the hook members at the bottom 48 are engaged into the receptacles 491 and looped over the rod 49 thus supporting the knife structure on the divider. The knife drive housing is then tilted upwardly and rearwardly to bring the latch components 46, 47 at top of the crop divider housing into engagement for pulling the housing of the crop divider knife structure into engagement with the crop divider housing. This movement causes the inter-engaging couplings 41 and 42 automatically into connection as the cooperating input and output couplings 41 and 42 are located between the top and bottom of the crop divider housing.

Figures 4, 5:
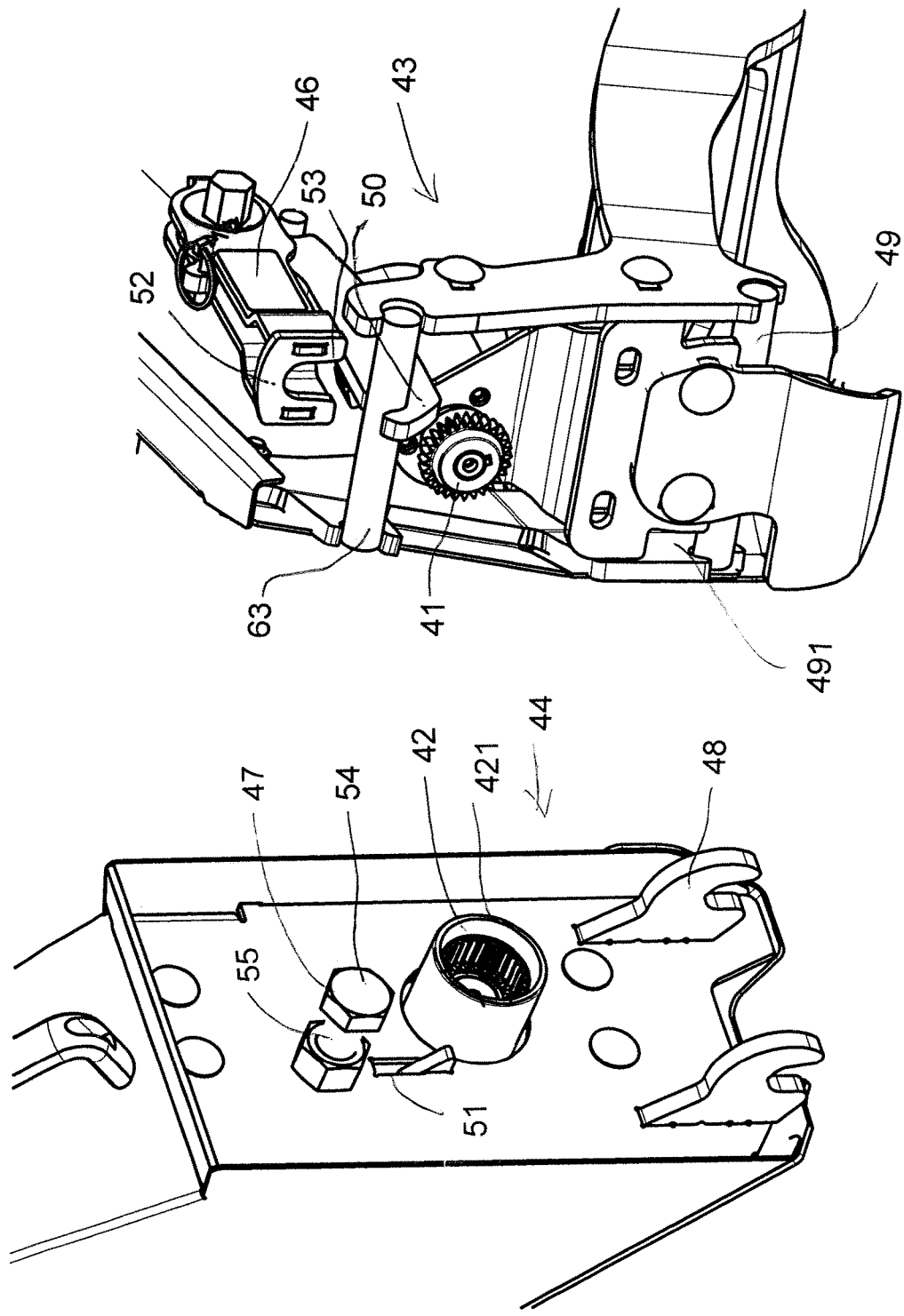
FIG. 4 is an end elevational view of the divider of FIG. 1 with the cutting device removed.
FIG. 5 is an end elevational view of the cutting device of FIG. 1.
Figure 6:
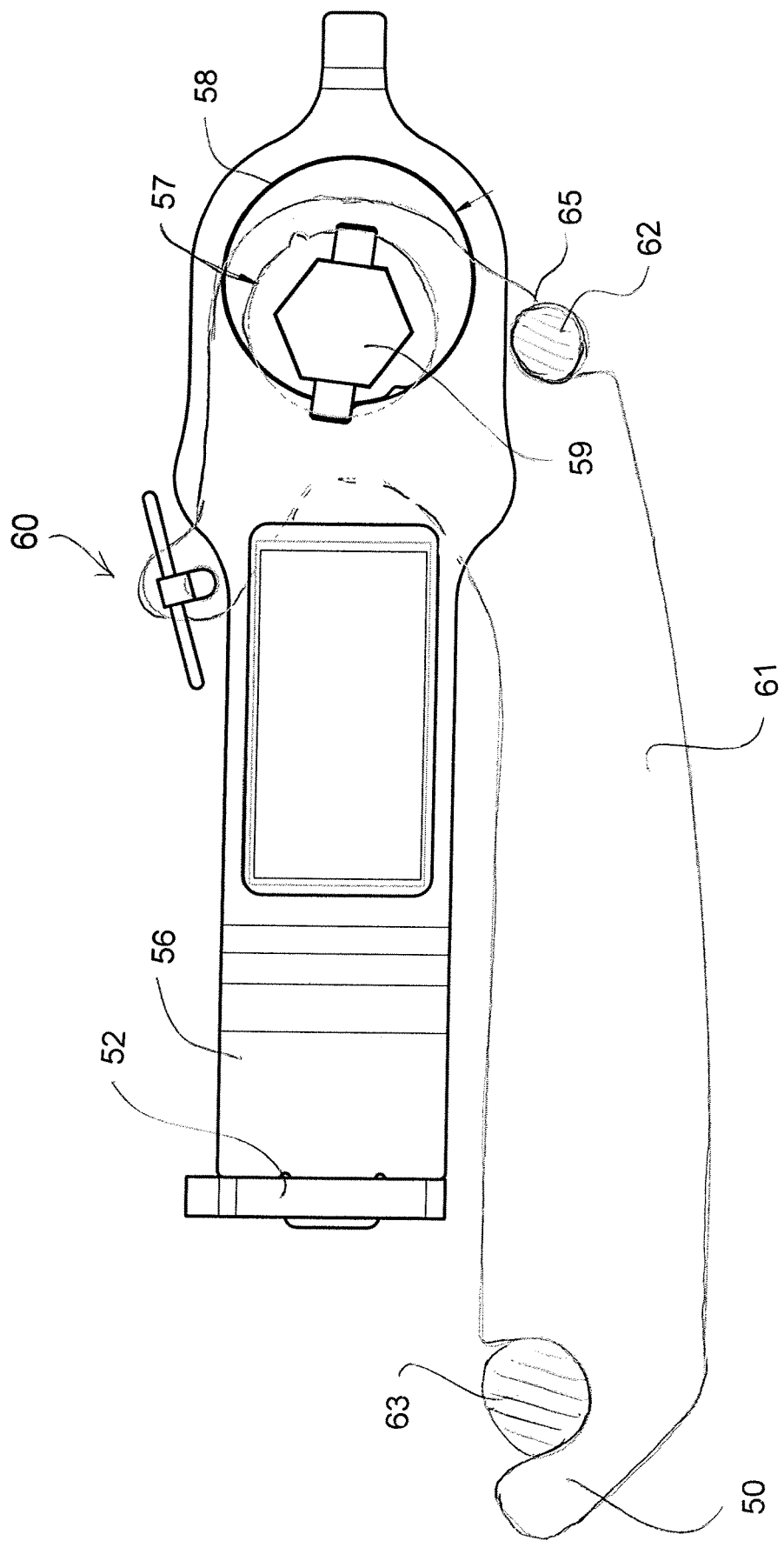
FIG. 6 is a side elevational view of the latch only of FIG. 1.

As best shown in FIGS. 4, 5 and 6, the coupling 41 is a disk with an external ring of teeth and the coupling 42 is a sleeve with an internal ring of grooves to receive the periphery of the dis of coupling 42. A collar 421 of plastic material covers the coupling when engaged. A projecting finger 50 on the mounting 43 projects into a receptacle 51 on the mounting 44 to act for alignment purposes as the mountings come together by rotation around the axis of the rod 49. Each has an inclined surface to provide vertical alignment and the sides of the receptacle 51 provide side to side alignment.

The latch 46 includes a front plate 52 with a slot 53 to engage behind the head 54 of a bolt 55. When the plate is pulled rearwardly by a pulling plate 56 operated by an eccentric 57 in an opening 58 in the plate, this retracts the plate 52 and pulls the head 54 into close engagement with the divider. The eccentric 57 is rotated by a hex nut 59 by the worker using a wrench. A locking pin 60 can be applied to ensure the plate 52 is held in engagement with the bolt 55. The plate 56 Is carried on a support plate 61 coupled together at the eccentric. The support plate is carried on a rod 63 at the forward end and provides the forwardly projecting alignment finger 50. The rod 63 bridges side walls of the housing of the divider to hold the finger 50 properly located in eh divider and to support the latch when not in use. A rear rod 62 snaps into a receptacle 65 on the plate 61 when eh latch is moved to the operating position pulling on the head 54.

The same hook and latch coupling can be used to hold a replacement facing structure such as a cone when the vertical knife structure is removed.

Figure 7:
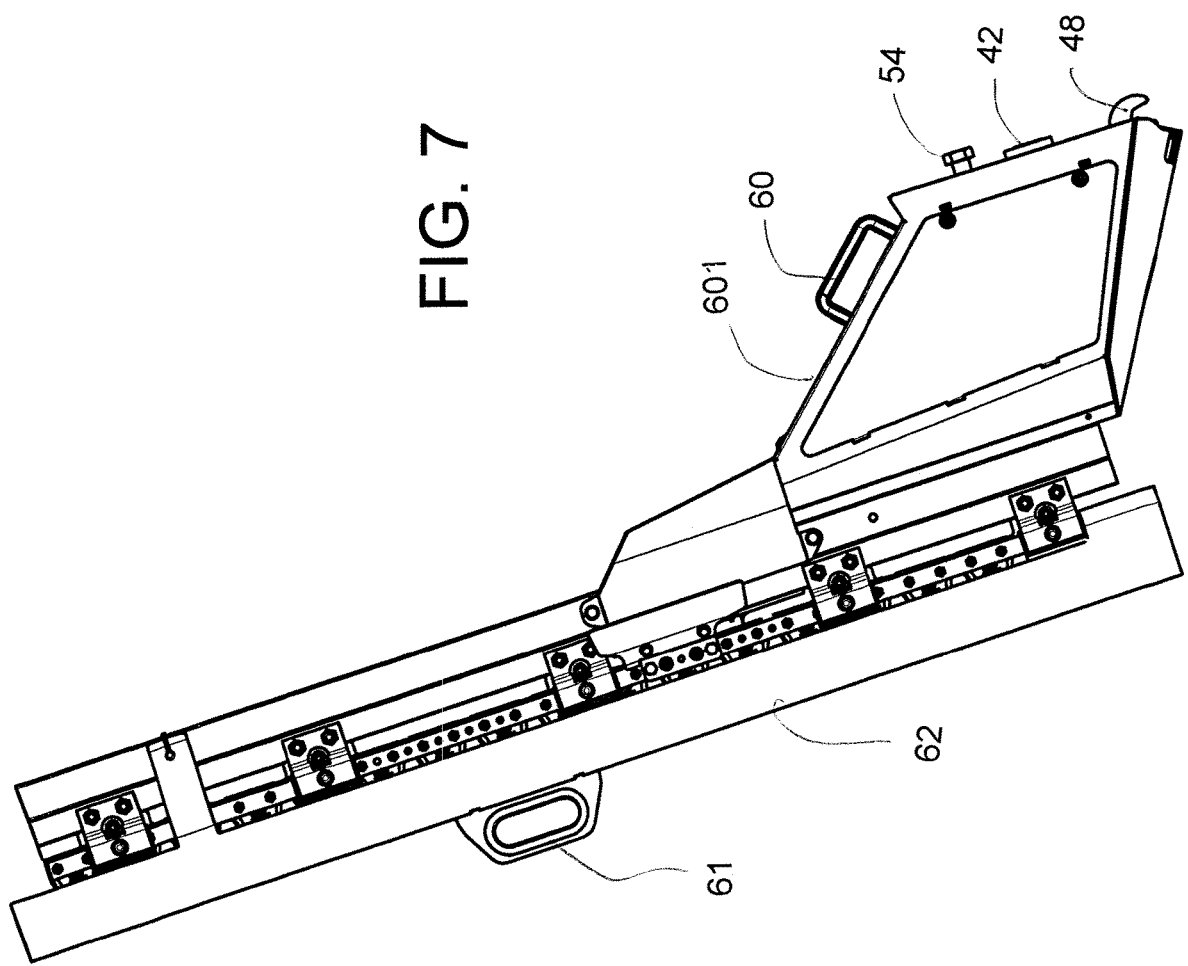
FIG. 7 shows a side elevational view of the vertical knife system of FIG. 1 when removed from the divider and including a cover and handle for manipulation.

As shown in FIG. 7 is a view of the divider knife structure when removed from the divider which includes a handle 60 on an upper face 601 of the housing and a further handle 61 on a cover 62 applied over the blades for safety. In this manner the whole divider cutter system can be easily manipulated by the worker and moved into place by the handles 60 and 61 to a position where the hooks 48 are engaged into place and the housing pivoted onto the end face of the divider.

The invention claimed is:

1. A crop harvesting header for a harvester comprising:
    a main frame structure extending across between two ends of the header across a width of the header for movement in a direction generally at right angles to the width across ground including a crop to be harvested;
    a mounting assembly for carrying the main frame structure on the harvester;
    a cutter bar across a front of the main frame structure carrying a cutter knife operable for cutting the crop as the header is moved forwardly across the ground;
    a crop transport system for moving the cut crop toward a discharge location of the header for feeding the crop into a feed opening of the harvester;
    first and second crop dividers each at a respective end of the main frame structure and defining an end wall confining cut crop onto the transport system;
    and first and second cutting device each mounted on a forward end of a respective one of the first and second crop dividers for cutting and dividing crop at the respective divider;

each divider having a hydraulic motor and an output coupling mounted on the divider for providing drive to the cutting devices;

each divider having a mounting assembly thereon for coupling to a cooperating mounting assembly on the cutting device by which the cutting devices is readily attachable to the crop divider for operation and releasable from the crop divider when not required;

each cutting device having an input coupling thereon for cooperating attachment to the output coupling arranged such that the input coupling and output coupling are released from cooperating attachment by the release of the cutting device from the crop divider;

the mounting assembly of the crop divider including at least one member for hooked engagement with a cooperating component of the cutting device and a latch which pulls the cutting device into engagement with the crop divider.

2. The crop harvesting header according to claim 1 wherein the latch is manually operable by a human operator.

3. The crop harvesting header according to claim 1 wherein the cooperating component of the cutting device comprises hook elements which pivot around an axis of the member on the crop divider to allow the cutting device to pivot into engagement with the crop divider.

4. The crop harvesting header according to claim 1 wherein the cooperating component forming the hooked engagement is at the bottom of the cutting device allowing the cutting device to pivot upwardly and toward the crop divider.

5. The crop harvesting header according to claim 1 wherein the latch is at the top of the crop divider to cooperate with a top portion of the cutting device in latching engagement.

6. The crop harvesting header according to claim 1 wherein the latch is above the output coupling.

7. The crop harvesting header according to claim 1 wherein the hydraulic motor has a shaft with an axis thereof extending generally forwardly of the crop divider and carrying thereon said output coupling rotatable about said axis.

8. The crop harvesting header according to claim 1 wherein the mounting assembly includes at least one bar member for hooked engagement with a cooperating component of the cutting device located at one of the top or bottom of the crop divider and a latch at the other of the top or bottom of the crop divider for pulling the cutting device into engagement with the crop divider, and wherein the cooperating input and output couplings are located between the top and bottom of the crop divider.

9. The crop harvesting header according to claim 8 wherein the cooperation component is at the bottom of the cutting device for engagement with the bar member at the bottom of the crop divider and allows pivotal movement of the cutting device around an axis upwardly and toward the crop divider.

10. The crop harvesting header according to claim 9 wherein there is provided a handle on the cutting device to help lift the device for said pivotal movement around the pivot axis.

\* \* \* \* \*